United States Patent Office 3,491,148
Patented Jan. 20, 1970

3,491,148
PRODUCTION OF AMINES FROM MIXTURES CONTAINING N-AMYL ALCOHOL AND CYCLOPENTANOL
Siegfried Winderl, Hubert Corr, and Erich Haarer, Ludwigshafen (Rhine), Germany, assignors to Badische Anilin- & Soda-Fabrik Aktiengesellschaft, Ludwigshafen (Rhine), Germany
No Drawing. Filed Feb. 13, 1967, Ser. No. 615,358
Claims priority, application Germany, Feb. 19, 1966, B 85,871
Int. Cl. C07c 85/06, 87/123, 87/34
U.S. Cl. 260—563                                7 Claims

ABSTRACT OF THE DISCLOSURE

A process for the manufacture of pure amines from mixtures containing n-amyl alcohol and cyclopentanol such as are obtained by the hydrogenation of byproducts from the air oxidation of cyclohexane. The said mixtures of alcohols are converted with ammonia into the amines in the presence of conventional hydrogenation catalysts and if desired in the presence of hydrogen at superatmospheric pressure and elevated temperature, and the mixture of amines is separated by distillation in the presence of such an amount of water as is necessary to form the n-amylamine/water azeotrope.

Distillation of crude cyclohexanol/cyclohexanone mixtures as obtained in the air oxidation of cyclohexane yields first runnings which essentially consist of n-amyl alcohol, cyclopentanone, n-hexanone-(2) and n-hexanone-(3). Hydrogenation of this fraction affords a mixture consisting essentially of n-amyl alcohol and cyclopentanol as well as minor amounts of isomeric hexanols. This alcohol mixture cannot be separated into its pure components by distillation, while as such it is more or less useless for further chemical reactions.

It is an object of the present invention to provide a process for preparing pure amines from mixtures containing n-amyl alcohol and cyclopentanol which are difficult to use. Another object of the invention is to provide a process in which the mixture of n-amyl-amine and cyclopentylamine obtained intermediately is separated into the pure amines in a simple manner.

In accordance with this invention these and other objects and advantages of the invention are achieved by reacting mixtures which contain n-amyl alcohol and cyclopentanol and have been obtained by the hydrogenation of byproducts from the air oxidation of cyclohexane with ammonia in the presence of hydrogenation catalysts and, if desired, hydrogen at temperatures of 100 to 300° C. and pressures of from 10 to 500 atmospheres and separating the mixture of n-amylamine and cyclopentylamine by distillation in the presence of such an amount of water as is necessary to form the n-amylamine/water azeotrope.

Mixtures of alcohols used as starting material preferably consist essentially of 50 to 80 wt. percent n-amyl alcohol, 10 to 40 wt. percent cyclopentanol and 5 to 15 wt. percent isomeric hexanols, based on the total amount of alcohols. In addition to the said substances the mixtures may contain small amounts, for example up to 10 wt. percent, of other compounds.

The alcohol mixtures are usually reacted with 8 to 20 moles, preferably 10 to 15 moles, of ammonia per mole of alcohol, and it is expedient to additionally use 5 to 100 l. (S.T.P.), preferably 10 to 50 l. (S.T.P.), of hydrogen per mole of alcohol.

The reaction is carried out at pressures between 10 and 500 atmospheres, preferably between 150 and 300 atmospheres.

Amination is effected at temperatures of 100 to 300° C. Particularly good results are achieved at temperatures between 180 and 250° C.

Suitable catalysts are the well-known hydrogenation catalysts, such as precious-metal catalysts, preferably cobalt or nickel catalysts. They are used either as the pure metals or in admixture with copper, chromium, manganese, vanadium, tungsten, molybdenum, barium, sodium, or phosphoric or boric acid. The metals may be supported on carriers, such as alumina, pumice or silica gel. Particularly good results are achieved by starting with oxygen compounds of the said metals, such as oxides or other oxygen compounds of the said metals, e.g. carbonates, hydroxides, formates or oxalates which are converted into the oxides on heating. Highly stable catalysts are also obtained by heating the catalysts to their sintering temperatures. It is advantageous to heat the catalysts prior to use in the presence of hydrogen, e.g. to 200 to 300° C.

An essential feature of the invention consists in separating the resultant amine mixture by distillation in the presence of water. The amount of water used should be such as is necessary to form the n-amylamine/water azeotrope comprising 68.5 wt. percent n-amylamine and 31.5 wt. percent water, based on the total amount of n-amylamine and water.

The process according to this invention may for example be carried out by continuously passing the alcohol mixture, ammonia and hydrogen in the ratio specified over the catalyst arranged in a vertical high-pressure reactor. The excess ammonia is removed from the reaction mixture by distillation and the aqueous phase separated from the distillation residue. The water and n-amylamine contents are determined in the organic phase and such an amount of water is added as to set up the n-amylamine/water azeotrope. Fractional distillation affords the n-amylamine/water azeotrope as the lowest-boiling fraction and then pure cyclopentylamine. Pure n-amylamine may be obtained from the n-amylamine/water azeotrope by conventional processes, e.g. by distillation using benzene as entrainer. The next fraction to distil is the hexylamines. Unreacted alcohols remain in the residue and are returned to the reaction.

n-Amylamine and cyclopentylamine obtained according to this invention are suitable as additives to cracked gasolines for the prevention of gum formation as described in U.S. Patent 1,940,445, and also for the manufacture of webbing agents and emulsifiers as described in German Patent No. 595,173.

The invention is further illustrated by the following example in which the parts are by weight. Parts by weight bear the same relation to parts by volume as the kilogram to the liter (S.T.P.) under standard conditions.

Example 50 parts by volume of hydrogen per hour is passed at 250° C. over a period of 48 hours through a high-pressure reactor charged with 0.5 part by volume of a catalyst of 80% by weight of cobalt and 20% by weight of copper in the form of the oxides. Then 100 parts of a mixture of 65% by weight of n-amyl alcohol, 27% by weight or cyclopentanol and 8% by weight of isomeric hexanols is fed to the reactor per hour as well as 0.35 part by volume of liquid ammonia and 20 parts by volume (S.T.P.) of hydrogen, the reactor being maintained at 200° C. and 300 atmospheres gauge.

The reaction mixture is distilled to remove the ammonia and the organic phase is separated. The latter contains 35.3% by weight of n-amylamine (determined by gas chromatography) and 6.9% by weight of water (determined according to Fischer). 232 parts of water is added to 2,460 parts of organic phase and the mixture subjected to fractional distillation. 1,240 parts of an n-amylamine/water azeotrope boiling at 91 to 92° C. and 280 parts of cyclopentylamine boiling at 106 to 108° C. are obtained. The water is removed from the n-amylamine/water mixture by azeotropic distillation with benzene. The content of pure n-amylamine is 840 parts.

We claim:

1. A process for the production of n-amylamine and cyclopentylamine which comprises: reacting a mixture containing 50 to 80% by weight of n-amyl alcohol and 10 to 40% by weight of cyclopentanol, which mixture has been obtained by the hydrogenation of byproducts from the air oxidation of cyclohexane, with 8 to 20 moles of ammonia per mole of alcohol at temperatures of 100° to 300° C. and pressures of 10 to 500 atmospheres in the presence of hydrogenation catalysts and hydrogen to form a mixture containing n-amylamine and cyclopentylamine; and subsequently distilling the mixture containing said n-amylamine and said cyclopentylamine in the presence of a sufficient amount of water to form an n-amylamine/water azeotrope with the entire amount of n-amylamine contained in said mixture.

2. A process as claimed in claim 1 wherein the starting mixture contains 50 to 80% by weight of n-amyl alcohol and 10 to 14% by weight of cyclopentanol.

3. A process as claimed in claim 1 wherein 10 to 15 moles of ammonia is used per mole of alcohol.

4. A process as claimed in claim 1 carried out in the presence of hydrogen.

5. A process as claimed in claim 1 wherein temperatures of 180 to 250° C. are used.

6. A process as claimed in claim 1 wherein pressures of 150 to 300 atmospheres are used.

7. A process as claimed in claim 1 wherein catalysts containing cobalt or nickel are used.

References Cited

UNITED STATES PATENTS 2,043,965   6/1936   Smeykal _____ 260—563 X

OTHER REFERENCES

Groggins: Unit Processes in Org. Sym., 1958, p. 433–434.

CHARLES B. PARKER, Primary Examiner

CHARLES F. WARREN, Assistant Examiner

U.S. Cl. X.R.

260—585, 617, 638